US007835827B2

(12) United States Patent
Peed et al.

(10) Patent No.: US 7,835,827 B2
(45) Date of Patent: Nov. 16, 2010

(54) METHODS, SYSTEMS AND COMPUTER PROGRAM PRODUCTS FOR COMMUNICATING AUDITORY ALERT TO AIRCRAFT

(75) Inventors: Doyle T. Peed, Roxboro, NC (US); Peter M. Moertl, Silver Spring, MD (US); David A. Domino, Riva, MD (US); James D. Nickum, Bristow, VA (US)

(73) Assignee: The Mitre Corporation, McLean, VA (US)

( * ) Notice: Subject to any disclaimer, the term of this patent is extended or adjusted under 35 U.S.C. 154(b) by 782 days.

(21) Appl. No.: 11/812,220

(22) Filed: Jun. 15, 2007

(65) Prior Publication Data

US 2008/0312780 A1 Dec. 18, 2008

(51) Int. Cl.
*G06F 17/00* (2006.01)

(52) U.S. Cl. .................. 701/9; 701/3; 701/16; 340/247

(58) Field of Classification Search .................... 701/1, 701/3, 4, 14, 16, 120, 300, 301, 9; 342/29–37, 342/57, 58, 60, 147; 340/980–983, 947, 340/979

See application file for complete search history.

(56) References Cited

U.S. PATENT DOCUMENTS 6,947,742 B1 9/2005 Corrigan
7,181,160 B2 * 2/2007 Barrett ...................... 455/11.1
7,535,404 B2 * 5/2009 Corrigan ...................... 342/29

* cited by examiner

*Primary Examiner*—Richard M. Camby
(74) *Attorney, Agent, or Firm*—Sterne, Kessler, Goldstein & Fox P.L.L.C.

(57) ABSTRACT

Systems, methods, and computer-program products for communicating auditory alerts about runway hazards to aircraft. A conflict on at least one arrival runway is identified using information received from an existing conflict detection system. An auditory alert associated with the conflict is generated and then modulated onto a carrier frequency. The carrier frequency may be a 75 MHz marker beacon carrier frequency, and further, the carrier frequency may be slightly offset from the 75 MHz marker beacon carrier frequency. The modulated alert is transmitted to an aircraft approaching the arrival runway through a directional antenna, which receives the transmitted auditory alert through a marker beacon receiver without requiring additional flight deck equipment. The transmitted alert does not interfere with transmissions from both an outer marker beacon associated with the arrival runway and marker beacons associated with adjacent runways due to transmitted power levels and antenna directivity. Also, with the transmitted carrier frequency shifted slightly from the marker beacon carrier frequency, the transmitted alert would not interfere with the inner or outer marker on the arrival runway.

29 Claims, 5 Drawing Sheets

METHODS, SYSTEMS AND COMPUTER PROGRAM PRODUCTS FOR COMMUNICATING AUDITORY ALERT TO AIRCRAFT

STATEMENT REGARDING FEDERALLY SPONSORED RESEARCH AND DEVELOPMENT

The U.S. government has a paid up license in this invention and the right in limited circumstances to require the patent owner to license others on reasonable terms as provided for by the terms of Contract No. DTFA01-01-C-00001 awarded by the Federal Aviation Administration.

BACKGROUND OF THE INVENTION

1. Field of the Invention

The present invention relates to methods, systems, and computer program products for communicating audio alerts to aircraft. More particularly, the present invention relates to methods, systems, and computer-program products for communicating auditory alerts regarding potential conflicts on arrival runways to approaching aircraft.

2. Background Art

The United States National Airspace System (NAS) comprises nearly 500 airports that collectively handle over 176,000 takeoffs on a daily basis. From 2001 to 2004, the Federal Aviation Administration reported that over 275 million flights passed through the NAS, rendering it the busiest air traffic management system in the world. During that same period, the FAA identified 1,395 runways incursions, resulting in a rate of 5.4 runway incursions per million flights.

The safe and efficient operation of the NAS stems from clear communication and smooth coordination between more than 15,000 air traffic controllers, 600,000 pilots, and thousands of airport vehicle operators that work within the NAS. In particular, the prevention of runway incursions depends upon the coordination between ground controllers, who are responsible for movement on the airport surface, local controllers, who verbally issue clearances for takeoffs and landings on the arrival and departure runways, and pilots, who respond to the instructions of local and ground controllers. However, given the increasing level of activity within the NAS, it may become difficult to maintain the clear communication and smooth coordination essential to the safe operation of aircraft within the NAS.

A number of automated alerting systems have been developed to supplement the close coordination between ground control, local control, and pilots. These automated systems often identify potential conflicts on the airport surface and then alert air traffic controllers to these potential conflicts who then in turn provide alerts to the cockpit. Other systems provide information to aircraft operating on airport surfaces, such as departure runways and taxiways, and to aircraft on final approach to arrival runways.

Unfortunately, a number of issues limit the wider adoption of these existing alerting systems within the NAS. In particular, systems that alert air traffic controllers about conflicts often delay the issuance of alerts to the cockpit. Systems that provide alerts directly to the cockpit require additional hardware and software that must be integrated into existing avionics systems on the aircraft.

Further, systems that do leverage existing receiver technologies, such as marker beacon receivers aboard aircraft within the NAS, function only on airport surfaces, and are often restricted to transmitting messages to aircraft from distances on the order of several feet. These systems are therefore inadequate to transmit advisory messages, cautions, and warnings concerning potential conflicts to aircraft approaching arrival runways from distances greater than a nautical mile. The term advisories as used here refers to situation awareness enhancing information. The term caution as used here refers to information that may require subsequent action from the flight crew. The term warning as used here refers to information requiring immediate subsequent action from the flight crew.

BRIEF SUMMARY OF THE INVENTION

The present invention relates to systems, methods and computer program products for communicating auditory alerts about runway hazards to aircraft. In one aspect, a system communicates auditory alerts to aircraft. The system comprises means for receiving information that identifies a conflict on at least one arrival runway. The identified conflict may represent a potential collision between approaching aircraft and at least one of an aircraft located on the arrival runway, a vehicle located on the arrival runway, and an obstruction located on the arrival runway. The system further comprises means for generating an auditory alert associated with the conflict and means for modulating the auditory alert onto a carrier frequency. The carrier frequency may be a 75 MHz marker beacon carrier frequency, or alternatively, the carrier frequency may be slightly offset from the 75 MHz marker beacon carrier frequency. The system also comprises an antenna for transmitting the modulated alert to an aircraft approaching the arrival runway, where the approaching aircraft receives the transmitted auditory alert through a marker beacon receiver.

In another aspect, a method communicates auditory alerts to aircraft. The method comprises receiving information that identifies a conflict on at least one arrival runway. The identified conflict may represent a potential collision between approaching aircraft and at least one of an aircraft located on the arrival runway, a vehicle located on the arrival runway, and an obstruction located on the arrival runway. The method further comprises generating an auditory alert associated with the conflict and modulating the auditory alert onto a carrier frequency. The carrier frequency may be a 75 MHz marker beacon carrier frequency, or alternatively, the carrier frequency may be slightly offset from the 75 MHz marker beacon carrier frequency. The method also comprises transmitting the modulated alert to an aircraft approaching the arrival runway, where the aircraft receives the transmitted auditory alert through a marker beacon receiver.

In yet another aspect, a computer program product comprises a computer useable medium having computer program logic recorded thereon for enabling a processor to communicate auditory alerts to aircraft. The computer program logic comprises means for enabling a processor to receive information that identifies a conflict on at least one arrival runway. The identified conflict may represent a potential collision between approaching aircraft and at least one of an aircraft located on the arrival runway, a vehicle located on the arrival runway, and an obstruction located on the arrival runway. The computer program logic further comprises means for enabling a processor to generate an auditory alert associated with the identified conflict and means for enabling a processor to modulate the auditory alert onto a marker beacon carrier frequency. The carrier frequency may be a 75 MHz marker beacon carrier frequency, or alternatively, the carrier frequency may be slightly offset from the 75 MHz marker beacon carrier frequency. The computer program logic also comprises means for enabling a processor to transmit the modulated alert to an aircraft approaching the arrival runway, wherein the aircraft receives the transmitted alert through a marker beacon receiver.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated in and constitute part of the specification illustrate embodiments of the invention and, together with the general description given above and a detailed description of the embodiments given below, serve to explain the principles of the present invention.

Figure 1:
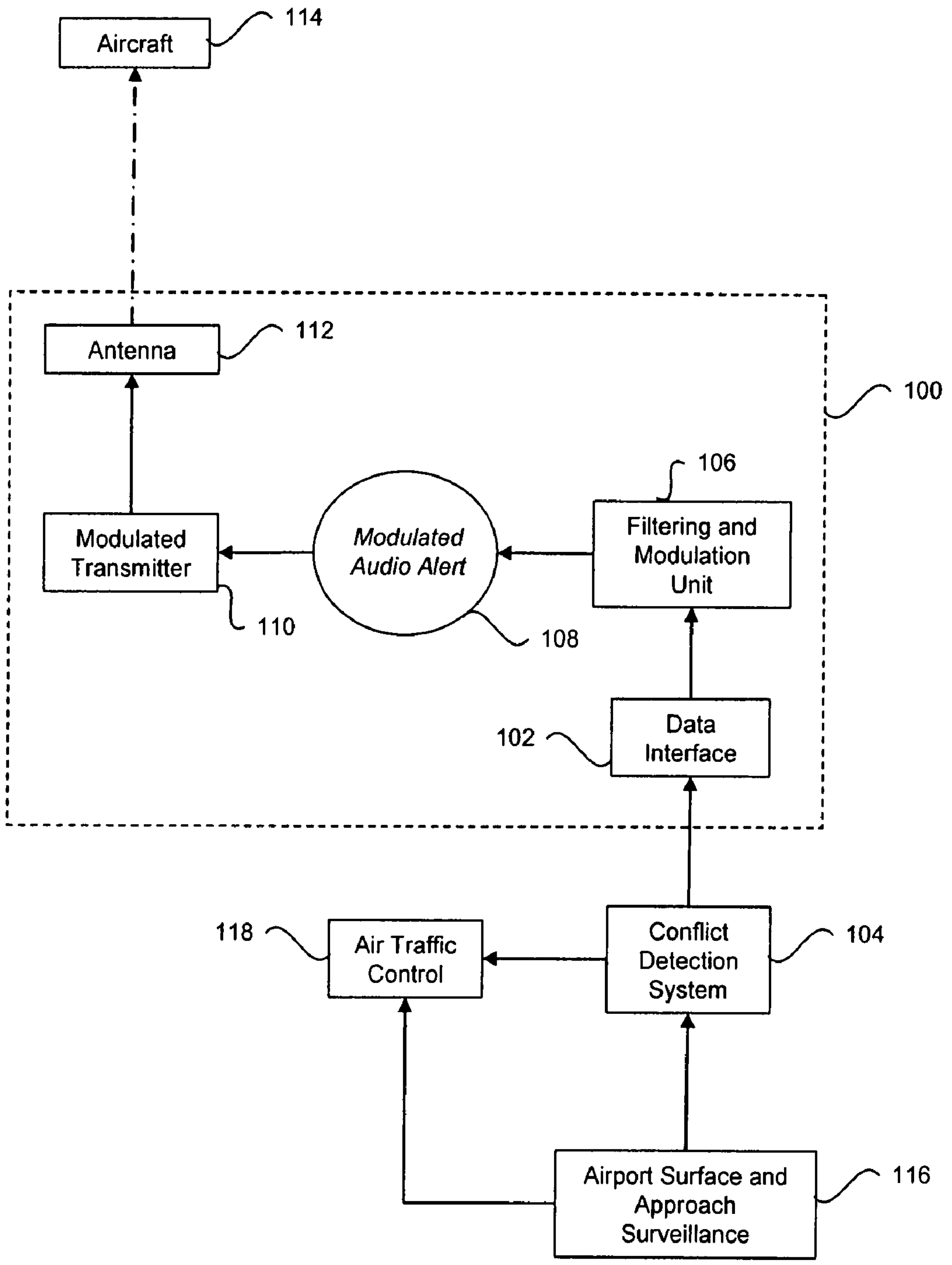
FIG. 1 is a detailed overview of an exemplary system for communicating auditory alerts to aircraft in accordance with an embodiment of the present invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

The present invention, as described below, may be implemented in many different embodiments of software, hardware, firmware, and the entities illustrated in the figures. Any actual software code with a specialized control of hardware to implement the present invention is not limiting to the present invention. Thus, the operational behavior of the present invention will be described with the understanding that modifications and variations of the embodiments are possible, given the level of detail presented herein.

FIG. 1 is a detailed overview of an exemplary system 100 for communicating auditory alerts to aircraft on approach to an arrival runway in accordance with an embodiment of the present invention. In exemplary system 100, a data interface 102 receives data identifying a potential conflict on at least one arrival runway from an external conflict detection system 104.

In FIG. 1, conflict detection system 104 predicts potential conflicts on an airport surface for arrival situations based on data received from an airport surface surveillance system 116. Airport surface surveillance system 116 may be an existing surface movement radar (SMR) system that monitors the movement of both aircraft and vehicles on the airport surface, and examples of SMR systems include, but are not limited to, an Airport Movement Area Safety System (AMASS), an Airport Surface Detection Equipment X-band radar with Multilateration (ASDE-X), and an Airport Surface Detection Equipment Model 3 with Multilateration (ASDE-3X). In one embodiment, air traffic control 118 receives data from airport surface surveillance system 116, and air traffic control 118 may display the received data on a surface radar display. Further, air traffic control 118 may be notified directly of conflict situations by conflict detection system 104.

The potential conflict may involve an aircraft located on the arrival runway, and in additional embodiments, the predicted conflict may represent a vehicle or other obstacle located on the arrival runway. The data received through data interface 102 may identify the arrival runway and identify that a potential conflict exists on the arrival runway, and further, the received data may include a call sign that identifies the aircraft on approach to the arrival runway.

Data interface 102 transmits the received data to a filtering and modulation unit 106, which processes the received data to generate an auditory alert associated with the potential conflict. In one embodiment, the generated auditory alert is a spoken message that identifies the call sign of the approaching aircraft, the arrival runway, and the potential conflict present on the arrival runway.

Based on a time to conflict, the generated auditory alert may serve as an advisory, a caution, or a warning to the approaching aircraft. In one embodiment, the generated auditory alert may serve as an advisory to the approaching aircraft that identifies the potential conflict on the arrival runway. Alternatively, the generated auditory alert may caution the approaching aircraft that the potential conflict on the arrival runway requires attention. The generated auditory alert may also represent a warning to the approaching aircraft that immediate action is required to avoid the conflict on the arrival runway. Further, the nature of the generated auditory alert may change from advisory to caution to warning, or vise versa, as the approaching aircraft nears the arrival runway.

Filtering and modulation unit 106 modulates the auditory alert onto a carrier frequency to generate a modulated auditory alert 108. In one embodiment, filtering and modulation unit 106 modulates the generated auditory alert onto a 75 MHz carrier frequency used by the existing marker beacon stations, such as an outer marker beacon, a middle marker beacon, and an inner marker beacon, use to transmit signals to approaching aircraft. In an additional embodiment, filtering and modulation unit 106 modulates the auditory alert onto a carrier frequency slightly offset from the 75 MHz carrier frequency used by the existing marker beacon stations. These carrier frequency examples are provided for illustrative purposes only, and are not limiting.

Modulated auditory alert 108 is then passed to a modulated transmitter 110, which transmits modulated auditory alert 108 through an antenna 112 to an aircraft 114 on final approach to the arrival runway. In one embodiment, antenna 112 is a highly-directional antenna positioned near a threshold of the arrival runway to transmit modulated auditory alert 108 to aircraft 114 along an approach corridor of the arrival runway. Additionally, antenna 112 may be a phased array of antennas that transmits modulated auditory alert 108 to aircraft 114, or antenna 112 may be any additional transmitting device that provides the necessary signal coverage along the approach corridor. Further, a beam width of antenna 112 may restrict modulated auditory alert 108 to the approach corridor associated with the arrival runway.

An existing receiver onboard aircraft 114 may detect modulated auditory alert 108 and broadcast the auditory alert to the flight crew. In a preferred embodiment, approaching aircraft 114 receives modulated auditory alert 108 through an existing marker beacon receiver that also detects transmissions from an outer marker beacon, a middle marker beacon, and an inner marker beacon associated with the arrival runway. As the majority of aircraft that fly into large airports are required to be equipped with marker beacon receivers, exemplary system 100 communicates auditory alert 108 to approaching aircraft 114 using existing flight-deck equipment, thereby eliminating the need for additional hardware or software commonly required by other alerting systems.

Figure 2:
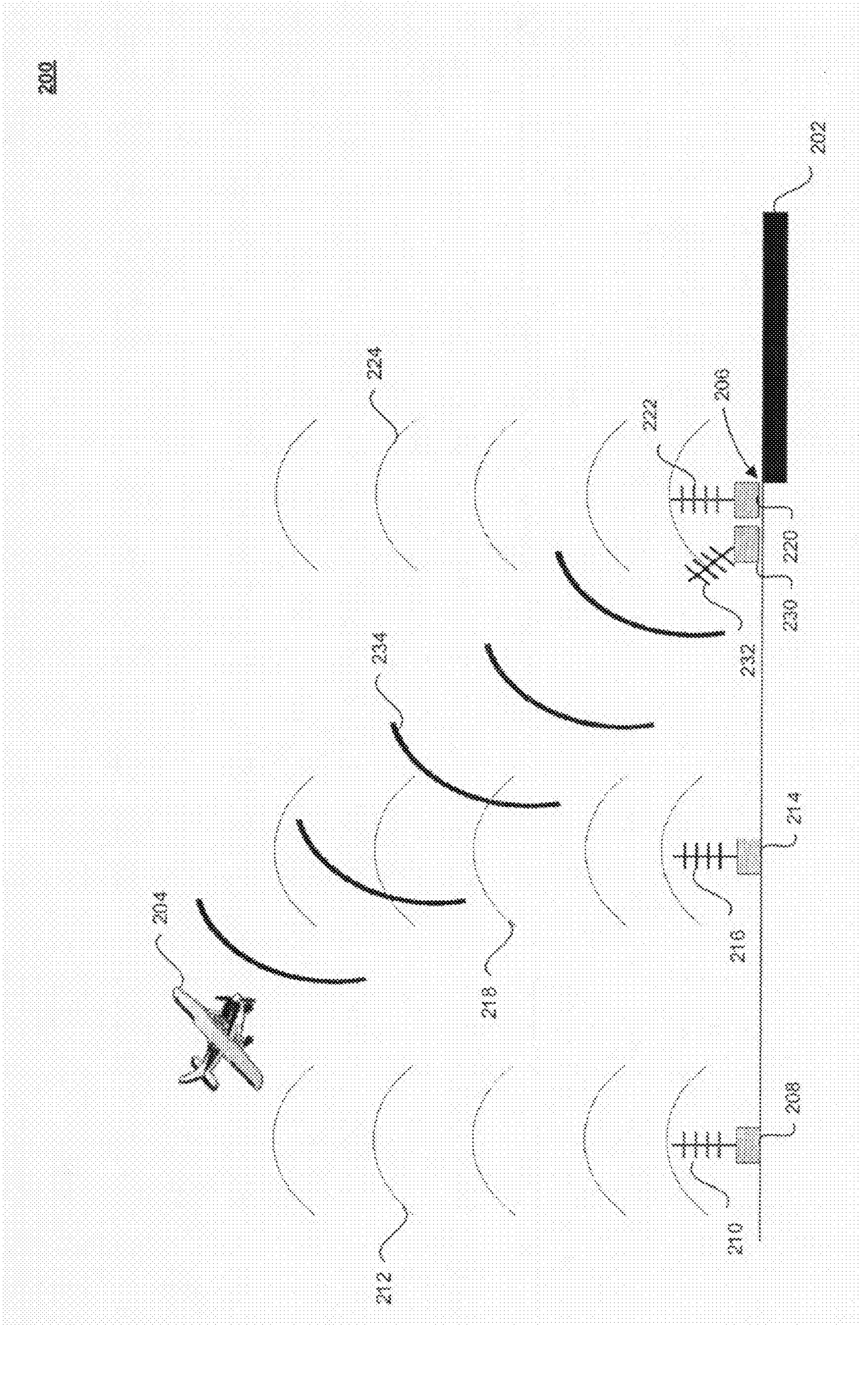
FIG. 2 is an example used to further describe the exemplary system described in the detailed overview of FIG. 1.

FIG. 2 is an example that further describes the exemplary system described in the detailed overview of FIG. 1. In FIG. 2, an aircraft 204 is on final approach to a runway 202. During final approach, a marker beacon receiver onboard aircraft 204 detects transmissions from an outer marker beacon 208, a middle marker beacon 214, and/or an inner marker beacon 220. Outer marker beacon 208, middle marker beacon 214, and inner marker beacon 220 are disposed along a centerline of runway 202 and at specified distances from a threshold 206 of runway 202. These transmissions trigger an aural and/or visual alarm on a marker beacon receiver aboard aircraft 204 that orients a flight crew of aircraft 204 with arrival runway 202 and indicates an approximate distance from threshold 206.

In an embodiment, outer marker beacon 208 may be disposed approximately 4 to 7 nautical miles from threshold 206 along the centerline of runway 202. Outer marker beacon 208 modulates an outer marker transmission 212 onto a 75 MHz carrier frequency, and a directional antenna 210 transmits outer marker transmission 212 upwards to approaching aircraft. In one embodiment, outer marker transmission 212 may be a low power, 400 Hz tone of continuous Morse code dashes. When an aircraft, such as aircraft 204, passes over outer marker beacon 208, the marker beacon receiver detects outer marker transmission 212. Outer marker transmission 212 may trigger a flashing blue light on the marker beacon receiver, and the continuous tone of Morse-code dashes may be audible to the flight crew.

In an embodiment, middle marker beacon 214 may be disposed approximately 0.5 to 0.8 nautical miles from threshold 206 along the centerline of runway 202. Middle marker beacon 214 modulates a middle marker transmission 218 onto the same 75 MHz carrier frequency used by outer marker transmission 212, and middle marker transmission 218 is transmitted continuously upwards from a directional antenna 216. In one embodiment, middle marker transmission 218 is a low power, 1,300 Hz tone of alternating Morse-code dots and dashes. When aircraft 204 passes over middle marker beacon 214, the marker beacon receiver detects middle marker transmission 218. Middle marker transmission 218 may trigger a flashing yellow light on the marker beacon receiver, and the alternating tone of Morse-code dots and dashes may be audible to the flight crew.

Inner marker beacon 220 may disposed at threshold 206 of runway 202, and inner marker beacon 220 modulates an inner marker transmission 224 onto the same 75 MHz carrier frequency used by middle marker transmission 218 and outer marker transmission 212. Inner marker transmission 224 may be transmitted continuously from a directional antenna 222, which may be positioned to transmit inner marker transmission 224 upwards to approaching aircraft 204. In one embodiment, inner marker transmission 224 may be a low power, 4,000 Hz tone of continuous Morse-code dots. When aircraft 204 passes over inner marker beacon 220, the marker beacon receiver aboard aircraft 204 detects inner marker transmission 224, triggering a flashing white light on the marker beacon receiver and broadcasting the continuous tone of Morse-code dots to the flight crew.

In one embodiment, an antenna 232 of an exemplary system 230 for communicating auditory alerts to aircraft may be positioned near threshold 206 of arrival runway 202. Antenna 232 may transmit an auditory alert 234 that identifies a potential conflict on arrival runway 202 to aircraft 204 during its final approach to arrival runway 202. Auditory alert 234 may represent a spoken message regarding a potential conflict on runway 202, and aircraft 204 may receive auditory alert 234 through the same marker beacon receiver that detects outer marker transmission 212, middle marker transmission 218, and inner marker transmission 224. In such an embodiment, exemplary system 230 communicates auditory alert 234 to aircraft 204 using existing flight deck equipment, thus eliminating the need for additional hardware and software required by many existing alerting systems.

To operate within the National Airspace System (NAS), auditory alert 234 cannot interfere with the operation of the existing marker beacon stations associated with arrival runway 202 or with the operation of marker beacon stations associated with any adjacent runways. Interference with inner marker transmission 224 and middle marker transmission 218 is an issue in those rare instances when a valid conflict exists on arrival runway 202 and auditory alert 234 is transmitted to approaching aircraft. In such a case, the Federal Aviation Administration may permit auditory alert 234 to interfere with inner marker transmission 224 and middle marker transmission 218, although under no circumstances may auditory alert 234 interfere with outer marker transmission 212 or with an outer marker transmission associated with an adjacent runway. In various embodiments, exemplary system 230 addresses these requirements through the positioning of antenna 232 and through one of a limitation on the signal strength of auditory alert 234 and the application of an offset to the carrier frequency of auditory alert 234.

In one embodiment, antenna 232 may be positioned near threshold 206 of runway 202 such that auditory alert 234 overpowers both inner marker transmission 224 and middle marker transmission 218, while simultaneously not overpowering outer marker transmission 212. Further, a beam width of antenna 232 may restrict auditory alert 234 to an approach corridor associated with runway 202, therefore eliminating interference between auditory alert 234 and marker beacon transmissions from adjacent runways.

In an additional embodiment, the strength of auditory alert 234 may be selected to overpower inner marker transmission 224 and middle marker transmission 218 without interfering with outer marker transmission 212. In general, a maximum power provided by transmitters of the marker beacon stations, such as the transmitters associated with inner marker beacon 220 and middle marker beacon 214, is nominally 2.5 W (approximately 34.0 dBm). To be audible over inner marker transmission 224, auditory alert 234 should overpower inner marker transmission 224 by at least 6 dB at the location of inner marker beacon 220, although in a preferred embodiment, auditory alert 234 overpowers inner marker transmission 224 by 10 dB to 12 dB. Further, if auditory alert 234 were to exceed the maximum transmitter power by at least 10 dB, then auditory alert 234 would overpower middle marker transmission 218 and would be audible to pilots aboard aircraft 204 in lieu of middle marker transmission 218.

In addition, auditory alert 234 must also not overpower outer marker transmission 212. A signal path loss of a auditory alert 234 over some distance D may be approximated as:

$$L=20\log(4\pi D/\lambda), \quad (1)$$

in which λ is the radio frequency (RF) carrier wavelength of auditory alert 234 and "log" is the natural logarithm to base 10. In the case where distance D is measured in nautical miles, Equation (1) may be simplified to yield:

$$L=20\log(fD)+K, \quad (2)$$

where f is the carrier frequency of auditory alert 304 and K is the constant 37.8.

In one embodiment, carrier frequency f is the 75 MHz carrier frequency associated with marker beacon stations 208, 214, and 220, and in FIG. 2, outer marker beacon 208 is nominally disposed 4.5 nautical miles from middle marker beacon 216. Using Equation (2), auditory alert 234 experiences a signal path loss of approximately −88.4 dB over the 4.5 nautical miles from middle marker beacon 214 to outer marker beacon 208. Therefore, the strength of auditory signal 234 should be below the strength of outer marker transmission 212 at outer marker beacon 208, and as such, RF carrier auditory alert 234 should not overpower outer marker transmission 212, even though auditory alert 234 overpowers both inner marker transmission 224 and middle marker transmission 218.

Further, the strength of auditory alert 234 may be adjusted to fall below both a high and a low sensitivity threshold of the marker beacon receiver at outer marker beacon 208. In one embodiment, the marker beacon receiver has selectable high and low sensitivity settings of 200 μV and 1000 μV, which correspond to −60 dBm and −47 dBm, respectively. Thus, the signal path loss of auditory alert 234 over the 4.5 nautical miles from middle marker beacon 214 to outer marker beacon 208 is below the low sensitivity threshold of the marker beacon receiver, but falls close to the high sensitivity threshold at outer marker beacon 208. Therefore, in some embodiments, the strength of auditory alert 234 may require additional adjustment to fall below the high sensitivity threshold of the marker beacon receiver on aircraft 204.

In yet another embodiment, any interference between auditory alert 234 and outer marker transmission 212 is eliminated by modulating auditory alert 234 onto a carrier frequency that is slightly offset from the 75 MHz carrier frequency of outer marker transmission 212. The offset may be selected such that an audio filter component of the marker beacon receiver filters any heterodyne resulting from the simultaneous receipt of the marker beacon transmission and auditory alert 234. Further, the offset may be selected to fall within an audio band pass of the marker beacon receiver.

In amplitude modulation (AM) systems, heterodyning occurs when an AM receiver, such as the marker beacon receiver on aircraft 204, receives two signals of roughly equivalent strengths at different carrier frequencies. For example, if the marker beacon receiver were to receive two signals of equivalent strength but offset by 800 Hz, an 800 Hz tone, or heterodyne, would pass through an audio filter of the marker beacon receiver and be audible to the flight crew. However, if the marker beacon receiver were to receive two signals of equivalent strengths offset in frequency by 8,000 Hz, the resulting 8,000 Hz heterodyne would be filtered by an audio filter of the marker beacon receiver and both signals would be audible to the flight crew.

By selecting the proper offset between the carrier frequencies of outer marker transmission 212 and auditory alert 234, both outer marker transmission 212 and auditory alert 234 would be detected by the marker beacon receiver on aircraft 204, and any resulting heterodyne would be filtered by the marker beacon receiver. Therefore, auditory alert 234 and outer marker transmission 212 would be simultaneously audible to the flight crew, and auditory alert 234 should not interfere with the detection and broadcast of outer marker transmission 212.

Figure 3:
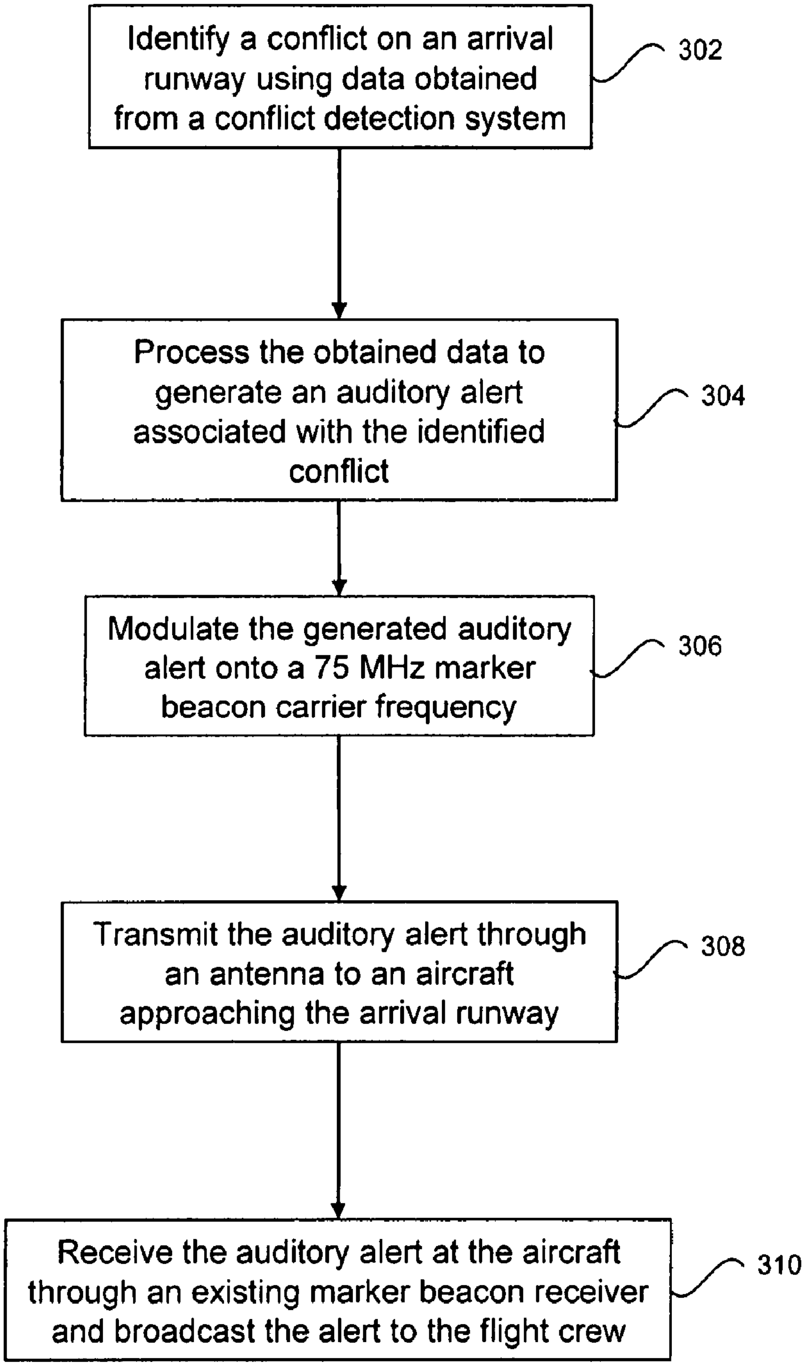
FIG. 3 is a detailed flow diagram of an exemplary system for communicating auditory alerts to aircraft in accordance with an embodiment of the present invention.

FIG. 3 is a detailed overview of an exemplary method 300 for communicating auditory alerts to aircraft approaching an arrival runway according to an embodiment of the present invention. In step 302, a potential conflict is identified on at least one arrival runway using data obtained from a conflict detection system. The conflict detection system may predict potential conflicts on arrival runways based on input from an airport surface surveillance system, such as an existing surface movement radar (SMR) system that monitors the movement of both aircraft and vehicles on the airport surface. Examples of SMR systems include, but are not limited to, ASDE-3X systems, AMASS systems, and ASDE-X systems.

The potential conflict may involve an aircraft located on the arrival runway, and in additional embodiments, the predicted conflict may represent a vehicle located on the arrival runway or an obstruction located on the arrival runway. The data obtained may identify the arrival runway and identify that a potential conflict exists on the arrival runway, and further, the obtained data may include a call sign that identifies the aircraft on approach the arrival runway.

In step 304, the data obtained from the conflict detection system is processed to generate an auditory alert associated with the identified conflict. In one embodiment, the generated auditory alert is a spoken message that identifies the call sign of the approaching aircraft, the arrival runway, and the potential conflict present on the arrival runway.

Based on a time to conflict, the generated auditory alert may serve as an advisory, a caution, or a warning to the approaching aircraft. In one embodiment, the generated auditory alert may serve as an advisory to the approaching aircraft that identifies the potential conflict on the arrival runway. Alternatively, the generated auditory alert may caution the approaching aircraft that the potential conflict on the arrival runway requires attention. The generated auditory alert may also represent a warning to the approaching aircraft that immediate action is required to avoid the conflict on the arrival runway. Further, the nature of the generated auditory alert may change from advisory to caution to warning, or vise versa, as the approaching aircraft nears the arrival runway.

Once generated, the auditory alert is modulated onto a carrier frequency in step 306 to generate a modulated auditory alert. In the embodiment of FIG. 3, the generated auditory alert is modulated onto a 75 MHz carrier frequency used by existing marker beacon stations to transmit marker beacon signals to aircraft during final approach to the arrival runway.

In step 308, the modulated auditory alert is transmitted through an antenna to the aircraft on final approach to the arrival runway. In one embodiment, the antenna is a highly-directional antenna positioned near a threshold of the arrival runway to transmit the auditory alert to the approaching aircraft along an approach corridor. Additionally, the antenna may be a phased array of antennas that transmits the auditory alert to the approaching aircraft, or the antenna may be any additional transmitting device that provides the necessary signal coverage to the approach corridor. Further, a beam width of antenna may restrict the auditory alert to the approach corridor associated with the arrival runway and therefore, may reduce interference with marker beacon stations on adjacent runways.

In step 310, a marker beacon receiver on the approaching aircraft receives the auditory alert identifying the conflict on the arrival runway and broadcasts the auditory alert to the flight crew. The alert may be an audible alert and/or a visual alert. In the embodiment of FIG. 3, a signal strength of the auditory alert may be adjusted to ensure that the auditory alert overpowers transmissions from an inner marker beacon and a middle marker beacon associated with the arrival runway, while simultaneously not overpowering a transmission from a corresponding outer marker beacon. Further, additional adjustment of the signal strength may be required to ensure that the signal strength falls below the high and low sensitivity settings of the marker beacon receiver at the position of the outer marker beacon.

As marker beacon receivers are standard equipment aboard most aircraft flying into large airports of the NAS, exemplary method 300 communicates auditory alerts to aircraft on approach to the arrival runway using existing flight equipment, thus eliminating the requirement for additional hardware and software required by existing alerting systems.

Figure 4:
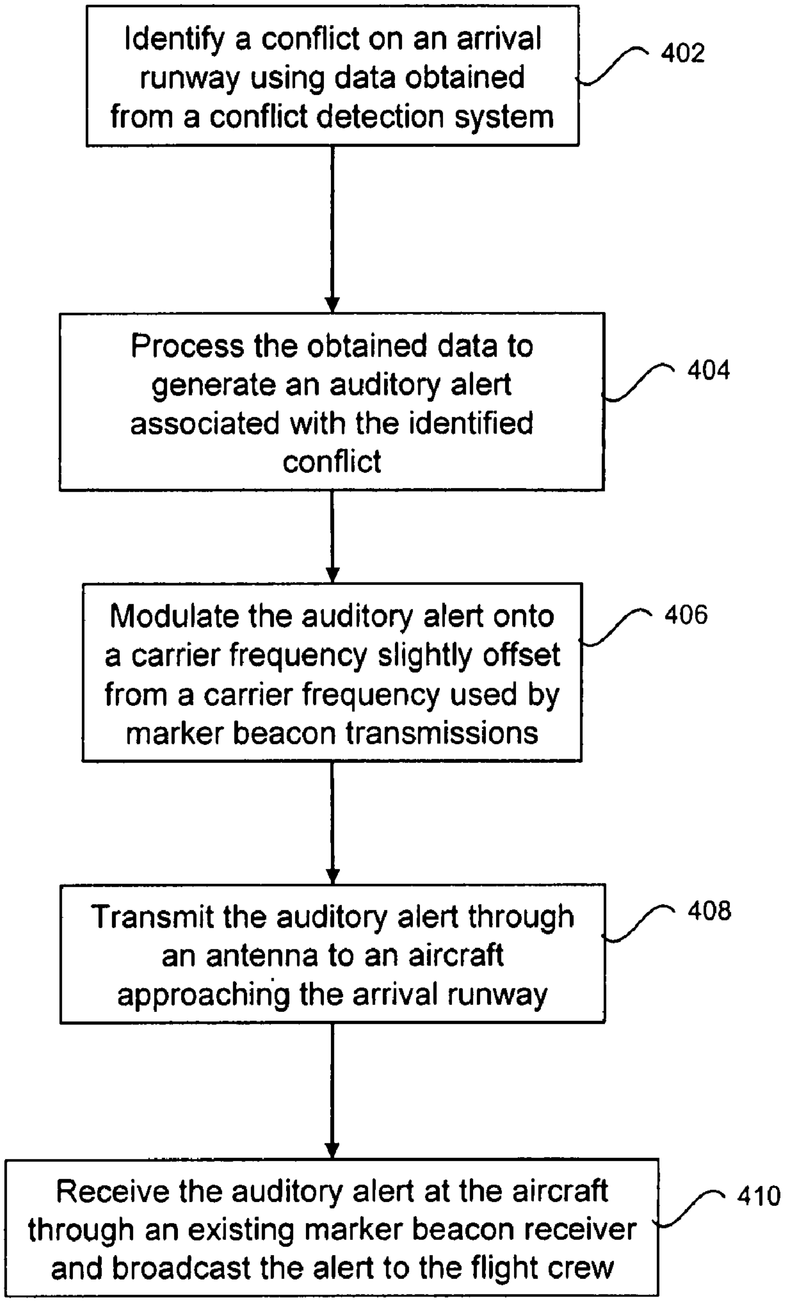
FIG. 4 is a detailed flow diagram of an exemplary system for communicating auditory alerts to aircraft in accordance with an additional embodiment of the present invention.

FIG. 4 is a detailed overview of an exemplary method 400 for communicating auditory alerts to aircraft approaching an arrival runway according to an embodiment of the present invention. In step 402, a potential conflict is identified on at least one arrival runway using data obtained from a conflict detection system. The conflict detection system may predict potential conflicts on arrival runways based on input from an airport surface surveillance system, such as an existing surface movement radar (SMR) system that monitors the movement of both aircraft and vehicles on the airport surface. Examples of SMR systems include, but are not limited ASDE-3X systems, AMASS systems, and ASDE-X systems.

The potential conflict may involve an aircraft located on the arrival runway, and in additional embodiments, the predicted conflict may represent a vehicle or other obstruction located on the arrival runway. The data obtained in step 402 may identify the arrival runway and identify that that a potential conflict exists on the arrival runway, and further, the obtained data may include a call sign that identifies the aircraft on approach the arrival runway.

In step 404, the data obtained from the conflict detection system is processed to generate an auditory alert associated with the identified conflict. In one embodiment, the generated auditory alert is a spoken message that identifies the call sign of the approaching aircraft, the arrival runway, and the potential conflict present on the arrival runway.

Based on a time to conflict, the generated auditory alert may serve as an advisory, a caution, or a warning to the approaching aircraft. In one embodiment, the generated auditory alert may serve as an advisory to the approaching aircraft that identifies the potential conflict on the arrival runway. Alternatively, the generated auditory alert may caution the approaching aircraft that the potential conflict on the arrival runway requires attention. The generated auditory alert may also represent a warning to the approaching aircraft that immediate action is required to avoid the conflict on the arrival runway. Further, the nature of the generated auditory alert may change from advisory to caution to warning, or vise versa, as the approaching aircraft nears the arrival runway.

In step 406, the auditory alert is modulated onto a carrier frequency that exhibits a slight offset from a 75 MHz carrier frequency used by existing marker beacon transmissions, and the modulated auditory alert is then transmitted in step 408 to an aircraft approaching the arrival runway. In one embodiment, the modulated alert is transmitted from a directional antenna positioned near a threshold of the arrival runway, and a beam width of the directional antenna restricts the auditory alert to an approach corridor associated with the arrival runway in order to eliminate interference with transmissions from marker beacons on adjacent runways. However, the directional antenna is not limited to such a position, and in additional embodiments, the directional antenna may be positioned at any location in proximity to the arrival runway that provides the necessary signal coverage along the approach corridor.

In step 410, the approaching aircraft receives the auditory alert through a marker beacon receiver that directly amplifies the auditory alert and broadcasts the alert to the flight crew. Unlike the embodiments of FIG. 3, no adjustment to the signal strength of the auditory alert is necessary to eliminate interference with transmissions from an outer marker beacon modulated onto a 75 MHz carrier frequency. The frequency offset described in step 406 may be selected to ensure that the carrier frequency falls within a band path of the marker beacon receiver, and further, that an audio filter component of the marker beacon receiver filters any heterodyne associated within the simultaneous receipt of the auditory alert and the outer marker beacon transmission. Accordingly, when the marker beacon receiver of the aircraft receives both the auditory alert and the transmission from the outer marker beacon, both the auditory alert and the outer marker transmission will be audible to the flight crew.

Further, as marker beacon receivers are standard equipment aboard most aircraft flying into large airports, exemplary method 400 communicates auditory alerts to aircraft on approach to the arrival runway using existing flight-deck equipage, thus eliminating the requirement for additional hardware and software common to existing alerting systems.

Although not described in FIGS. 3 and 4, the exemplary methods described above with respect to FIGS. 3 and 4 may require procedural changes on the flight deck. Example of these procedural changes include, but are not limited to, additional protocol that require pilots to verify that their marker beacon volume is turned up and selected for monitoring on their audio control panel.

Figure 5:
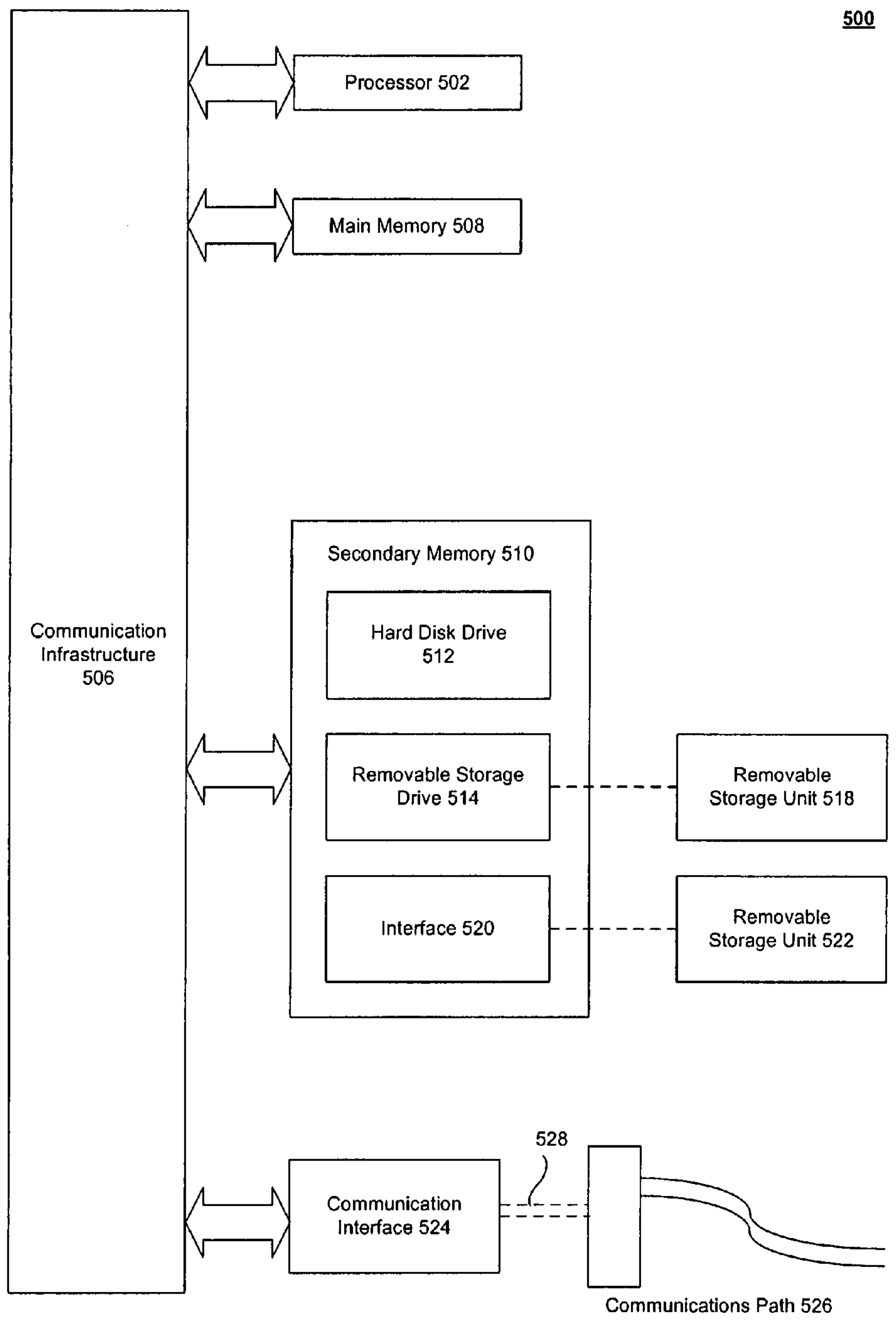
FIG. 5 is an exemplary computer architecture upon which the methods, systems, and computer program products of the present invention may be implemented in accordance with an embodiment of the invention.

FIG. 5 is an exemplary computer architecture 500 upon which the methods, systems, and computer program products of the present invention may be implemented, according to an embodiment of the invention. Exemplary computer system 500 includes one or more processors, such as processor 502. The processor 502 is connected to a communication infrastructure 506, such as a bus or network. Various example software implementations are described in terms of this exemplary computer system. After reading this description, it will become apparent to a person skilled in the relevant art how to implement the invention using other computer systems and/or computer architectures.

Computer system 500 also includes a main memory 508, preferably random access memory (RAM), and may include a secondary memory 510. The secondary memory 510 may include, for example, a hard disk drive 512 and/or a removable storage drive 514, representing a magnetic tape drive, an optical disk drive, CD/DVD drive, etc. The removable storage drive 514 reads from and/or writes to a removable storage unit 518 in a well-known manner. Removable storage unit 518 represents a magnetic tape, optical disk, or other storage medium that is read by and written to by removable storage drive 514. As will be appreciated, the removable storage unit 518 can include a computer usable storage medium having stored therein computer software and/or data.

In alternative implementations, secondary memory 510 may include other means for allowing computer programs or other instructions to be loaded into computer system 500. Such means may include, for example, a removable storage unit 522 and an interface 520. An example of such means may include a removable memory chip (such as an EPROM, or PROM) and associated socket, or other removable storage units 522 and interfaces 520, which allow software and data to be transferred from the removable storage unit 522 to computer system 500.

Computer system 500 may also include one or more communications interfaces, such as communications interface 524. Communications interface 524 allows software and data to be transferred between computer system 500 and external devices. Examples of communications interface 524 may include a modem, a network interface (such as an Ethernet card), a communications port, a PCMCIA slot and card, etc. Software and data transferred via communications interface 524 are in the form of signals 528, which may be electronic, electromagnetic, optical or other signals capable of being received by communications interface 524. These signals 528 are provided to communications interface 524 via a communications path (i.e., channel) 526. This channel 526 carries signals 528 and may be implemented using wire or cable, fiber optics, an RF link and other communications channels. In an embodiment of the invention, signals 528 comprise data packets sent to processor 502. Information representing processed packets can also be sent in the form of signals 528 from processor 502 through communications path 526.

The terms "computer program medium" and "computer usable medium" are used to refer generally to media such as removable storage units 518 and 522, a hard disk installed in hard disk drive 512, and signals 528, which provide software to the computer system 500.

Computer programs are stored in main memory 508 and/or secondary memory 510. Computer programs may also be received via communications interface 524. Such computer programs, when executed, enable the computer system 500 to implement the present invention as discussed herein. In particular, the computer programs, when executed, enable the processor 502 to implement the present invention. Where the invention is implemented using software, the software may be stored in a computer program product and loaded into computer system 500 using removable storage drive 514, hard drive 512 or communications interface 524.

CONCLUSION

The disclosed systems, methods, and computer program products communicate auditory alerts about runway safety hazards to aircraft.

In one embodiment, a conflict on at least one arrival runway is identified using information received from a conflict detection system. An auditory alert associated with the conflict is then generated, and the audio alert is modulated onto a carrier frequency. The carrier frequency may be a 75 MHz marker beacon carrier frequency, or alternatively, the carrier frequency may be slightly offset from the 75 MHz marker beacon carrier frequency. The auditory alert is transmitted to an aircraft approaching the arrival runway through an antenna, and the approaching aircraft receives the transmitted auditory alert through a marker beacon receiver. The transmitted alert does not interfere with either transmissions from an outer marker beacon associated with the arrival runway or with marker beacon stations associated with adjacent runways.

As marker beacon receivers are standard equipment aboard most aircraft flying into large airports, the auditory alerts are communicated to aircraft on approach to the arrival runway using existing flight-deck equipment, thus eliminating the requirement for additional hardware and software common to existing alerting systems.

The foregoing description of the specific embodiments will so fully reveal the general nature of the invention that others can, by applying knowledge within the skill of the art (including the contents of any references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system for communicating auditory alerts to aircraft, comprising:

a module operable to receive information that identifies a conflict on at least one arrival runway;

a module operable to generate an auditory alert associated with said conflict;

a module operable to modulate said auditory alert onto a carrier frequency; and a directional antenna for transmitting said modulated alert along a substantially non-vertical approach flight path for aircraft approaching said arrival runway, such that said transmitted alert is receivable by said aircraft through a marker beacon receiver during an approach at a distance at least corresponding to an inner marker beacon location.

2. The system of claim 1, wherein said conflict is a potential collision between said approaching aircraft and at least one of (i) an aircraft located on said arrival runway, (ii) a vehicle located on said arrival runway, and (iii) an obstruction located on said arrival runway.

3. The system of claim 1, wherein said carrier frequency is (i) a 75 MHz carrier frequency or (ii) a frequency offset from 75 MHz and within an audio pass band of said marker beacon receiver.

4. The system of claim 1, wherein said directional antenna is positioned near a threshold of said arrival runway.

5. The system of claim 1, wherein said directional antenna has a beam width that restricts said transmitted alert to an approach corridor associated with said arrival runway.

6. The system of claim 1, wherein said modulated alert has a signal strength sufficient to overpower both a transmission from an inner marker beacon and a transmission from a middle marker beacon.

7. The system of claim 1, wherein said carrier frequency is offset from a transmission frequency of an outer marker beacon, a transmission frequency of a middle marker beacon, and a transmission frequency of an inner marker beacon.

8. The system of claim 1, wherein said module operable to receive is further operable to receive (i) information identifying said arrival runway, (ii) information identifying that said arrival runway contains said conflict, and (iii) a call sign identifying said approaching aircraft.

9. A method for communicating auditory alerts to aircraft, comprising:

receiving information that identifies a conflict on at least one arrival runway;

generating an auditory alert associated with said identified conflict;

modulating said auditory alert onto a carrier frequency that is offset from a frequency associated with a marker beacon receiver and within an audio pass band of said marker beacon receiver; and transmitting said modulated alert to an aircraft approaching said arrival runway, wherein said transmitted alert is receivable by said aircraft through a said marker beacon receiver.

10. The method of claim 9, wherein said conflict is a potential collision between said approaching aircraft and at least one of (i) an aircraft located on said arrival runway, (ii) a vehicle located on said arrival runway, and (iii) an obstruction located on said arrival runway.

11. The method of claim 9, wherein said receiving step further comprises receiving (i) information identifying said arrival runway, (ii) information identifying that said arrival runway contains said conflict and (iii) a call sign identifying said approaching aircraft.

12. The method of claim 9, wherein said transmitting step comprises transmitting said modulated alert from a directional antenna positioned near a threshold of said arrival runway.

13. The method of claim 9, wherein said transmitting step comprises transmitting said modulated alert from a directional antenna having a beam width that restricts said transmitted alert to an approach corridor associated with said arrival runway.

14. The method of claim 9, wherein said transmitting step comprises transmitting said modulated alert at a signal strength sufficient to overpower both a transmission from an inner marker beacon and a transmission from a middle marker beacon.

15. The method of claim 9, wherein said modulating step comprises modulating said auditory alert onto a carrier frequency offset from a transmission frequency of an outer marker beacon, a transmission frequency of a middle marker beacon, and a transmission frequency of an inner marker beacon.

16. A tangible computer program product comprising a computer readable medium having computer program instructions recorded thereon that, if executed by a computing device, cause the computing device to perform a method for communicating auditory alerts to aircraft, the method comprising:

receiving information that identifies a conflict on at least one arrival runway;

generating an auditory alert associated with said identified conflict;

modulating said auditory alert onto a carrier frequency that is offset from a frequency associated with a marker beacon receiver and within an audio pass band of said marker beacon receiver; and transmitting said modulated alert to an aircraft approaching said arrival runway, wherein said transmitted alert is receivable by said aircraft through a said marker beacon receiver.

17. The computer program product of claim 16, wherein said conflict is a potential collision between said approaching aircraft and at least one of (i) an aircraft located on said arrival runway, (ii) a vehicle located on said arrival runway, and (iii) an obstruction located on said arrival runway.

18. The computer program product of claim 16, the method further comprising receiving (i) information identifying said arrival runway, (ii) information identifying that said arrival runway contains said conflict and (iii) a call sign identifying said approaching aircraft.

19. The computer program product of claim 16, the method further comprising transmitting said modulated alert from a directional antenna positioned near a threshold of said arrival runway.

20. The computer program product of claim 16, the method further comprising transmitting said modulated alert at a signal strength sufficient to overpower both a transmission from an inner marker beacon and a transmission from a middle marker beacon.

21. The computer program product of claim 16, the method further comprising modulating said auditory alert onto a carrier frequency offset from a transmission frequency of an outer marker beacon, a transmission frequency of a middle marker beacon, and a transmission frequency of an inner marker beacon.

22. A system for communicating auditory alerts to aircraft, comprising:

a module operable to receive information that identifies a conflict on at least one arrival runway;

a module operable to generate an auditory alert associated with said conflict;

a module operable to modulate said auditory alert onto a carrier frequency; and a module operable to transmit said modulated alert, at a signal strength sufficient to overpower a transmission from an inner marker beacon, along an approach flight path for aircraft approaching said arrival runway, such that said transmitted alert is receivable by said aircraft through a marker beacon receiver.

23. The system of claim 22, wherein said carrier frequency is (i) a 75 MHz carrier frequency or (ii) a frequency offset from 75 MHz and within an audio pass band of said marker beacon receiver.

24. The system of claim 22, wherein said module operable to transmit is a directional antenna for providing a beam width that restricts said transmitted alert to an approach corridor associated with said arrival runway.

25. The system of claim 22, wherein said carrier frequency is offset from a transmission frequency of an outer marker beacon, a transmission frequency of a middle marker beacon, and a transmission frequency of an inner marker beacon.

26. A method for communicating auditory alerts to aircraft, comprising:

receiving information that identifies a conflict on at least one arrival runway;

generating an auditory alert associated with said identified conflict;

modulating said auditory alert onto a carrier frequency; and transmitting said modulated alert, at a signal strength sufficient to overpower a transmission from an inner marker beacon, to an aircraft approaching said arrival runway, wherein said transmitted alert is receivable by said aircraft through a marker beacon receiver.

27. The method of claim 26, wherein said modulating step comprises modulating said auditory alert onto (i) a 75 MHz carrier frequency or (ii) a carrier frequency offset from 75 MHz and within an audio pass band of said marker beacon receiver.

28. The method of claim 26, further comprising transmitting said modulated alert using a directional antenna having a beam width that restricts said transmitted alert to an approach corridor associated with said arrival runway.

29. The method of claim 26, wherein said modulating step comprises modulating said auditory alert onto a carrier frequency offset from a transmission frequency of an outer marker beacon, a transmission frequency of a middle marker beacon, and a transmission frequency of an inner marker beacon.

* * * * *